United States Patent
Jiang et al.

(10) Patent No.: US 11,003,480 B2
(45) Date of Patent: May 11, 2021

(54) CONTAINER DEPLOYMENT METHOD, COMMUNICATION METHOD BETWEEN SERVICES, AND RELATED APPARATUS

(71) Applicant: HUAWEI TECHNOLOGIES CO., LTD., Guangdong (CN)

(72) Inventors: Yaoguo Jiang, Nanjing (CN); Feihu Jiang, Nanjing (CN); Junan Xie, Shenzhen (CN); Ruifeng Hu, Nanjing (CN); Haiyang Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 190 days.

(21) Appl. No.: 16/414,303

(22) Filed: May 16, 2019

(65) Prior Publication Data

US 2019/0272205 A1   Sep. 5, 2019

Related U.S. Application Data

(63) Continuation of application No. PCT/CN2017/104108, filed on Sep. 28, 2017.

(30) Foreign Application Priority Data

Nov. 25, 2016  (CN) .......................... 201611053035.7

(51) Int. Cl.
*G06F 9/455* (2018.01)
*G06F 9/50* (2006.01)
(Continued)

(52) U.S. Cl.
CPC .......... *G06F 9/45558* (2013.01); *G06F 9/455* (2013.01); *G06F 9/45533* (2013.01);
(Continued)

(58) Field of Classification Search
CPC ...... G06F 9/547; G06F 9/455; G06F 9/45558; G06F 9/505; G06F 9/5055; G06F 9/54;
(Continued)

(56) References Cited

U.S. PATENT DOCUMENTS 8,656,412 B2 * 2/2014 Kashyap ................. G06F 9/544
719/319
2011/0161988 A1   6/2011 Kashyap
(Continued)

FOREIGN PATENT DOCUMENTS

CN       103678203 A    3/2014
CN       105577779 A    5/2016
(Continued)

OTHER PUBLICATIONS

V. Marmol, R. Jnagal, and T. Hockin, "Networking in containers and container clusters," in Proceedings NetDev 0.1, 2015 (Year: 2015).*
(Continued)

*Primary Examiner* — Jacob D Dascomb
(74) *Attorney, Agent, or Firm* — Fish & Richardson P.C.

(57) ABSTRACT

A container deployment method increases access speed between isolated containers on a same host. The method includes: receiving a container deployment message including container image information and association information of a container; creating a container for a first service, and a first network namespace and a first IPC namespace corresponding to the container for the first service; creating a first load balancing container corresponding to the container for the first service, and setting a running parameter of the first load balancing container to a parameter of the first network namespace; creating a loopback interface in the first network namespace; determining that the network device has a container that is for a second service and that is associated with the container for the first service; and setting a starting (Continued)

parameter of the first load balancing container to a parameter of a second IPC namespace.

10 Claims, 8 Drawing Sheets

(51) Int. Cl.

| | | |
|---|---|---|
| *G06F 9/54* | (2006.01) | |
| *H04L 29/08* | (2006.01) | |
| *H04L 12/24* | (2006.01) | |
| *H04L 12/803* | (2013.01) | |
| *H04L 29/06* | (2006.01) | |
| *H04L 12/46* | (2006.01) | |
| *H04L 12/70* | (2013.01) | |

(52) U.S. Cl.
CPC .......... *G06F 9/505* (2013.01); *G06F 9/5055* (2013.01); *G06F 9/54* (2013.01); *G06F 9/547* (2013.01); *H04L 12/4641* (2013.01); *H04L 41/0803* (2013.01); *H04L 41/5054* (2013.01); *H04L 47/125* (2013.01); *H04L 63/0272* (2013.01); *H04L 67/10* (2013.01); *H04L 67/34* (2013.01); *G06F 2009/4557* (2013.01); *G06F 2009/45595* (2013.01); *H04L 67/42* (2013.01); *H04L 2012/5618* (2013.01)

(58) Field of Classification Search
CPC ......... G06F 9/45533; G06F 2009/4557; G06F 2009/45595; H04L 41/5054; H04L 41/0803; H04L 67/10; H04L 67/34; H04L 67/42; H04L 2012/5618; H04L 2012/4641; H04L 47/125; H04L 63/0272
See application file for complete search history.

(56) References Cited

U.S. PATENT DOCUMENTS

| | | |
|---|---|---|
| 2015/0341428 A1 | 11/2015 | Chauhan |
| 2017/0272400 A1* | 9/2017 | Bansal ................ H04L 61/1582 |

FOREIGN PATENT DOCUMENTS

| | | |
|---|---|---|
| CN | 105681217 A | 6/2016 |
| WO | 2015126292 A1 | 8/2015 |

OTHER PUBLICATIONS

J. Wang, K. Wright, and K. Gopalan, "XenLoop: A Transparent High Performance Inter-VM Network Loopback," Proc. 17th Int'l Symp. High Performance Distributed Computing (HPDC '08), pp. 109-118, Jun. 2008 (Year: 2008).*
"Introduction to Container Security Understanding the isolation properties of Docker" White Paper, Aug. 2016, 13 pages.
International Search Report dated Jan. 8, 2018 in corresponding International Patent Application No. PCT/CN2017/104108 (7 pages).
Written Opinion of the International Searching Authority dated Jan. 8, 2018 in corresponding International Patent Application No. PCT/CN2017/104108 (4 pages).
Office Action in Chinese Application No. 201611053035.7 dated Sep. 4, 2019, 6 pages.
International Search Report dated Jan. 8, 2018 in corresponding International Application No. PCT/CN2017/104108.
European Extended Search Report issued in European Application No. 07874844.8 dated May 24, 2019, 7 pages.
Nickoloff, "Docker in Action: Chapter 6: Limiting Risk with Isolation," Manning Publications Co., XP-002791248, Mar. 27, 2016, 22 pages.

* cited by examiner

CONTAINER DEPLOYMENT METHOD, COMMUNICATION METHOD BETWEEN SERVICES, AND RELATED APPARATUS

CROSS-REFERENCE TO RELATED APPLICATIONS

This application is a continuation of International Application No. PCT/CN2017/104108, filed on Sep. 28, 2017, which claims priority to Chinese Patent Application No. 201611053035.7, filed on Nov. 25, 2016, The disclosures of the aforementioned applications are hereby incorporated by reference in their entireties.

TECHNICAL FIELD

The present disclosure relates to the field of virtualization technologies, and in particular, to a container deployment method, a communication method between services, and a related apparatus.

BACKGROUND

With the emergence of a container technology represented by docker, a trend of using a container as an operation form of an application (application, App) appears in the industry. The docker container technology is a lightweight operating system virtualization technology. Although containers on a same host (a physical machine or a virtual machine) share an operating system kernel, resources (such as a CPU and a memory) used by different containers are mutually isolated. Isolation between containers is usually implemented by using a namespace (namespace) technology provided by a Linux kernel. The Linux kernel provides isolation functions of a host name, an interprocess communication (interprocess communication, IPC), a network (Network), a mount point (Mount), and a user (User) by using the namespace technology.

In the prior art, communication between different containers on a same host is usually performed through network communications. A docker container engine is taken as an example. When receiving a container deployment message and deploying a container, the docker container engine creates a bridge (bridge) named docker 0 on a host to provide a data exchange service for all containers, establishes a separate network namespace (network namespace, net namespace for short) for each container, and establishes a network interface (eth) in the network namespace of each container. Finally, a virtual network device pair (veth pair) technology (the virtual network device pair across the network namespace has two ends, and is similar to a tunnel) is used to start the network interface of the container to communicate with the docker0 bridge, as shown in FIG. 1a. The docker0 bridge may provide a network data exchange function for different containers on the same host, or may send a data packet in a container to an overlay network (overlay network) specified by the user, to perform cross-host node communication.

With the development of technologies, especially the development of Internet technologies, scale and complexity of an application are greatly increased. A conventional stovepipe monomer application architecture cannot adapt well to current application development, and therefore a microservice architecture appears. A general idea of the microservice architecture is to decouple the application, and divide a conventional monomer application into a plurality of services of a fine granularity, so as to reduce coupling of a system, and improve flexibility of the system. Microservices provide final value for a user through mutual coordination and cooperation. In the microservice architecture, the system is divided into a large quantity of independent services. Each service is served by a plurality of specific service instances. Therefore, traffic between services is relatively large, and the communication is relatively frequent. Compared with a conventional software architecture, a possibly quick communication method between services is required. In an existing application deployment solution based on a docker container shown in FIG. 1b, a service consumer application (SC App for short) and a load balancing (load balance, LB) module are deployed in a same docker container. A data communication speed of a memory access level between the SC App and the LB module may be reached in an IPC manner. The LB module communicates with a to-be-accessed service provider application (SP App for short) by using a network between containers. That is, the LB module sends, by using a virtual network interface eth0 of a container to which the SC App belongs, data of the SC App to the bridge named docker0 (docker0 bridge) on the host, and forwards, by using the bridge, the data of the SC App to a virtual network interface eth1 of a container to which the SP App belongs. Therefore, the containers on the same host access each other by using a network path from the virtual network interface eth0 to the bridge docker0 bridge, and then from the bridge docker0 bridge to the virtual network interface eth1. During the process, a series of link-layer and network-layer operations such as data packing and routing need to be performed. A data communication speed can be optimized.

To increase the data communication speed between the containers on the same host, the IPC manner may be used to increase the data communication speed. That is, containers that communicate with each other may be disposed in a same IPC namespace (namespace), so that the containers may communicate with each other by using the IPC, as shown in FIG. 1c. However, in the solution, although different containers may perform high-speed communication with each other by using the IPC, a container that does not need to perform communication performs IPC communication. For example, a container B needs to access a container A, a container C also needs to access the container A, but the container B and the container C do not need to perform data communication. In the solution, the container B and the container C also run in a same IPC namespace, and consequently, isolation between the container B and the container C is damaged. Therefore, if one container needs to be accessed by a plurality of other containers, isolation between all containers is damaged when the solution is used.

SUMMARY

This application provides a container deployment method, a communication method between services, and a related apparatus, so as to increase an access speed between containers while ensuring isolation between containers on a same host.

According to a first aspect, this application provides a container deployment method, applied to a network device. The network device may be any physical machine or virtual machine in a network. The network device receives a container deployment message, creates a corresponding container for a first service, and deploys the first service. The container deployment message includes container image information and association information of a container. The corresponding container is created for the first service based on the container image information, and a first network namespace and a first IPC namespace that are corresponding to a container for the first service are created. In addition, a corresponding first load balancing container is automatically created for the container for the first service, and a running parameter of the first load balancing container is set to a parameter of the first network namespace, so that the first load balancing container shares the first network namespace during running. A loopback interface is created in the first network namespace, so that the first load balancing container communicates with the container for the first service by using the loopback interface.

When determining, based on the association information of the container, that the network device has a container that is for a second service and that is associated with the container for the first service, the network device sets a starting parameter of the first load balancing container to a parameter of a second IPC namespace. The second IPC namespace is an IPC namespace corresponding to the container for the second service. Therefore, the first load balancing container can communicate with the container for the second service by using an IPC interface of the second IPC namespace after the first load balancing container is started.

The first load balancing container shares the first network namespace corresponding to the container for the first service during running, that is, may use a network device in the first network namespace. Therefore, a load balancing module running in the first load balancing container can be bound to the loopback interface established in the first network namespace, to provide a load balancing service. Except the container for the first service that is corresponding to the first load balancing container, another container cannot access the load balancing container by using the loopback interface, so as to ensure isolation between containers on a same host. When the network device has created the container for the second service, and determines, based on the received container deployment message, that the container for the first service is associated with the container for the second service, the network device sets the starting parameter of the first load balancing container to the parameter of the second IPC namespace corresponding to the container for the second service, so that when the first load balancing container is started, the first load balancing container may access the container for the second service by using the IPC interface of the second IPC namespace, so as to increase an access speed between containers while ensuring isolation between containers on a same host.

In a possible implementation, when determining, based on the association information of the container, that the network device has no container associated with the container for the first service, the network device sets a starting parameter of the first load balancing container to a parameter of a third IPC namespace. The third IPC namespace is an independent IPC namespace, and is different from both the first IPC namespace and a second IPC namespace. Therefore, an independent IPC namespace is configured for the first load balancing container, so as to ensure isolation between containers.

In a possible implementation, when the container deployment message is received, a bridge is created for the network device by starting a container engine, and the bridge is configured to provide a data exchange service. After the first network namespace and the first IPC namespace that are corresponding to the container for the first service are created, a virtual network device is created in the first network namespace. The virtual network device may be understood as a virtual network adapter. The virtual network device connects to the bridge, so that the container for the first service communicates with a container that is for another service and that is outside the first network namespace.

In a possible implementation, after the virtual network device is created, the network device sends, to a service registration center, a service address corresponding to the first service, where the service address corresponding to the first service includes a network interface address of the virtual network device and an IPC interface address of the first IPC namespace. Therefore, service addresses corresponding to all deployed services may be found by accessing the service registration center, and a corresponding service may be accessed by using the found service address.

According to a second aspect, this application provides a communication method between services, applied to the network device according to the first aspect of this application. The network device has created and run a container for a second service and a corresponding second load balancing container, and the container for the second service has a corresponding second network namespace and a second IPC namespace. When a container for a first service and a corresponding first load balancing container are created, a first network namespace and a first interprocess communication IPC namespace that are corresponding to the container for the first service are created, a running parameter of the first load balancing container is set to a parameter of the first network namespace, a loopback interface is created in the first network namespace, and a starting parameter of the first load balancing container is set to a parameter of the second IPC namespace, where the parameter of the second IPC namespace is different from a parameter of the first IPC namespace. Based on the foregoing content, the communication method between services includes:

The container for the first service sends a service access request to the first load balancing container by using the loopback interface created in the first network namespace, to access the container for the second service. The first load balancing container obtains, based on the service access request, a service address corresponding to the container for the second service, where the first load balancing container may query service addresses recorded in the service registration center, to find the corresponding service address used to access the container for the second service. The service address corresponding to the container for the second service includes a network interface address of the second network namespace corresponding to the container for the second service and an IPC interface address of the second IPC namespace. Therefore, the first load balancing container may access the container for the second service by using the IPC interface address of the second IPC namespace.

The first load balancing container shares the first network namespace corresponding to the container for the first service during running, that is, may use a network device in the first network namespace. Therefore, a load balancing module running in the first load balancing container can be bound to the loopback interface established in the first network namespace, to provide a load balancing service. Except the container for the first service that is corresponding to the first load balancing container, another container cannot access the load balancing container by using the loopback interface. Therefore, when the container for the first service is deployed while ensuring isolation between containers on a same host, the starting parameter of the first load balancing container is set to the parameter of the second IPC namespace corresponding to the container for the second service, so that when the first load balancing container is started, the first load balancing container may access the container for the second service by using the IPC interface address of the second IPC namespace, so as to increase an access speed between containers while ensuring isolation between containers on a same host.

According to a third aspect, this application provides a container deployment apparatus, where the container deployment apparatus includes at least one unit that is configured to perform the container deployment method according to any one of the first aspect or the implementations of the first aspect.

According to a fourth aspect, this application provides a communications apparatus between services, where the communications apparatus between services includes at least one unit that is configured to perform the communication method between services according to any one of the second aspect or the implementations of the second aspect.

According to a fifth aspect, this application provides a storage medium, and the storage medium stores program code. When the program code is run by a network device, the container deployment method according to any one of the first aspect or the implementations of the first aspect is performed. The storage medium includes but is not limited to a flash memory, a hard disk drive (HDD), or a solid state drive (SSD).

According to a sixth aspect, this application provides a storage medium, and the storage medium stores program code. When the program code is run by a network device, the communication method between services according to any one of the second aspect or the implementations of the second aspect is performed. The storage medium includes but is not limited to a flash memory, a hard disk, or a solid state drive.

DESCRIPTION OF EMBODIMENTS

In the specification, claims, and accompanying drawings of this application, the terms "first", "second", and so on are intended to distinguish between similar objects but do not necessarily indicate a specific order or sequence. The following describes the technical solutions in the embodiments of this application with reference to the accompanying drawings in the embodiments of this application.

Figure 1A:
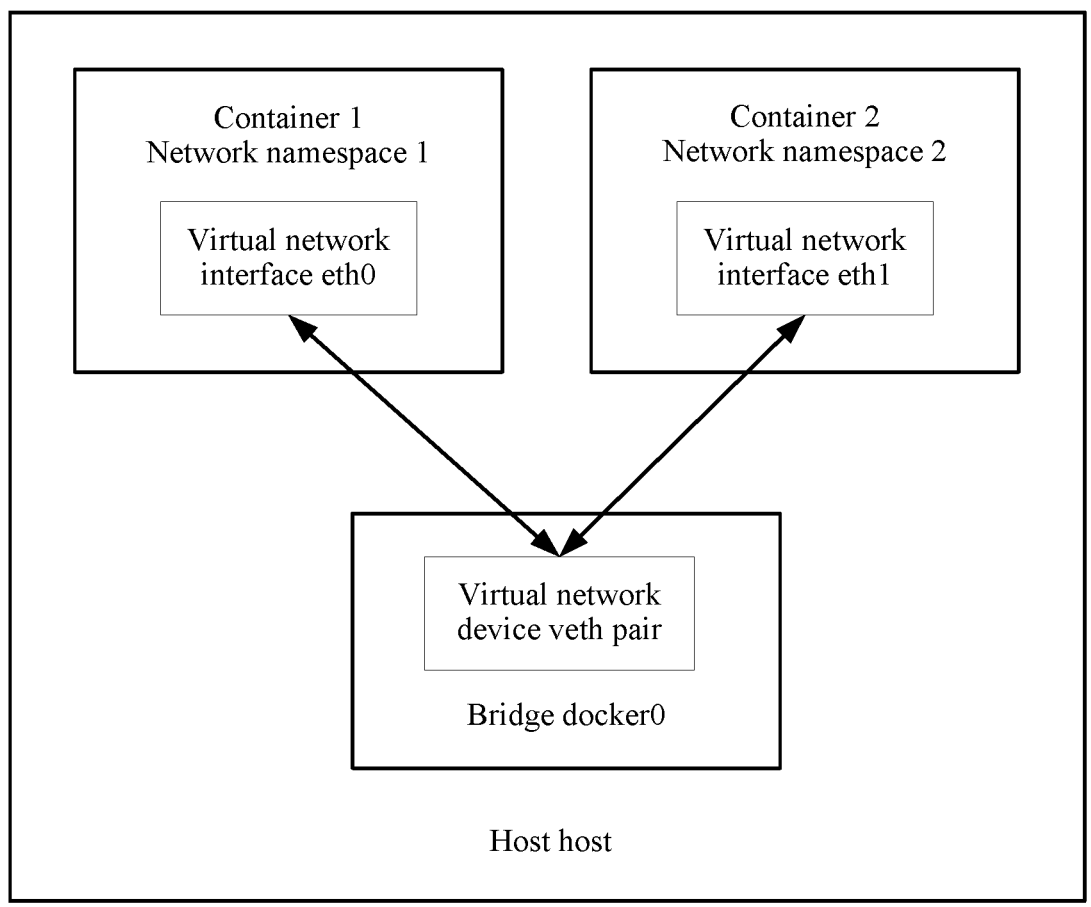
FIG. 1a is a schematic structural diagram of a container deployment solution according to this application.
Figure 1B:
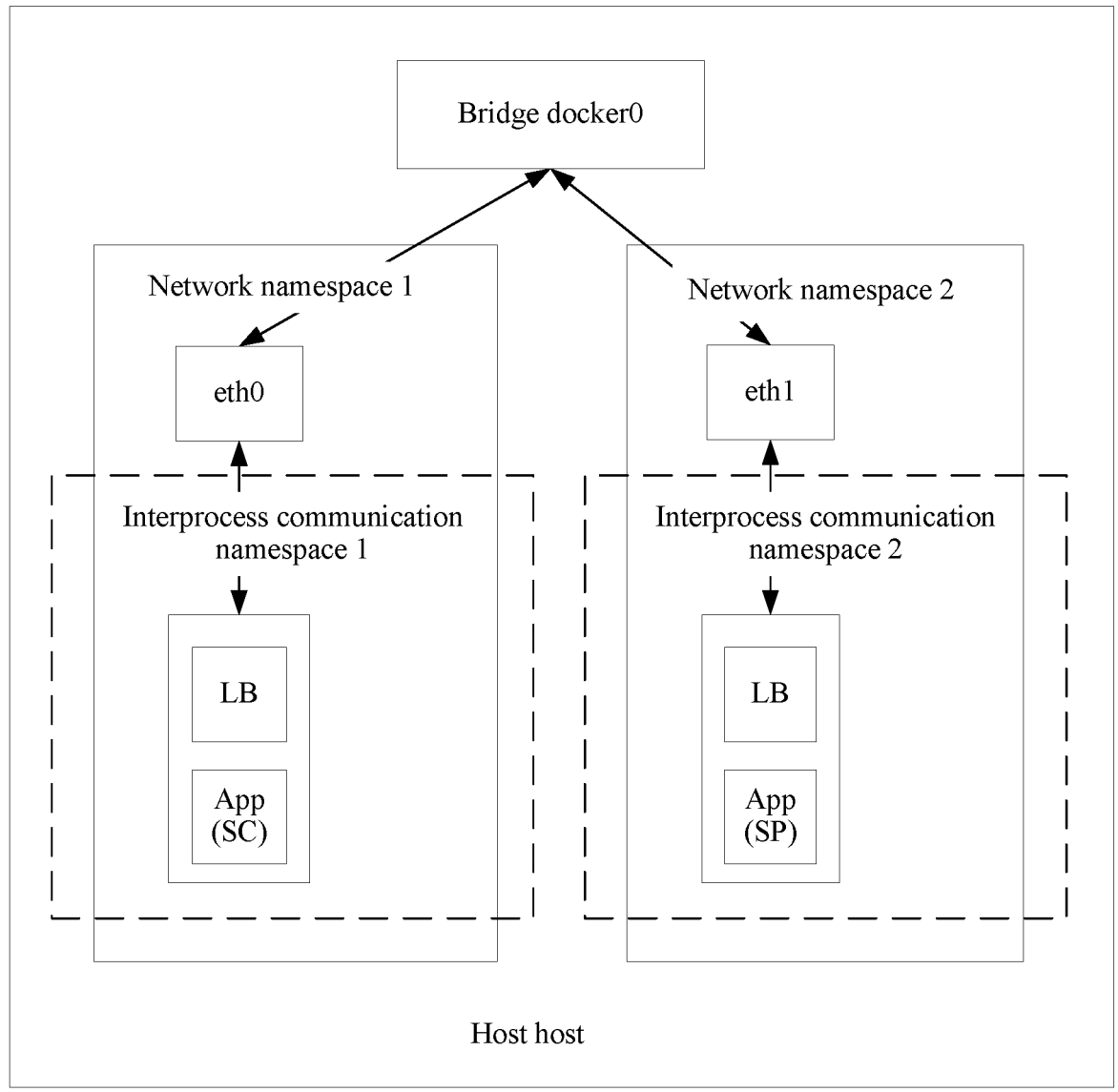
FIG. 1b is another schematic structural diagram of a container deployment solution according to this application.
Figure 1C:
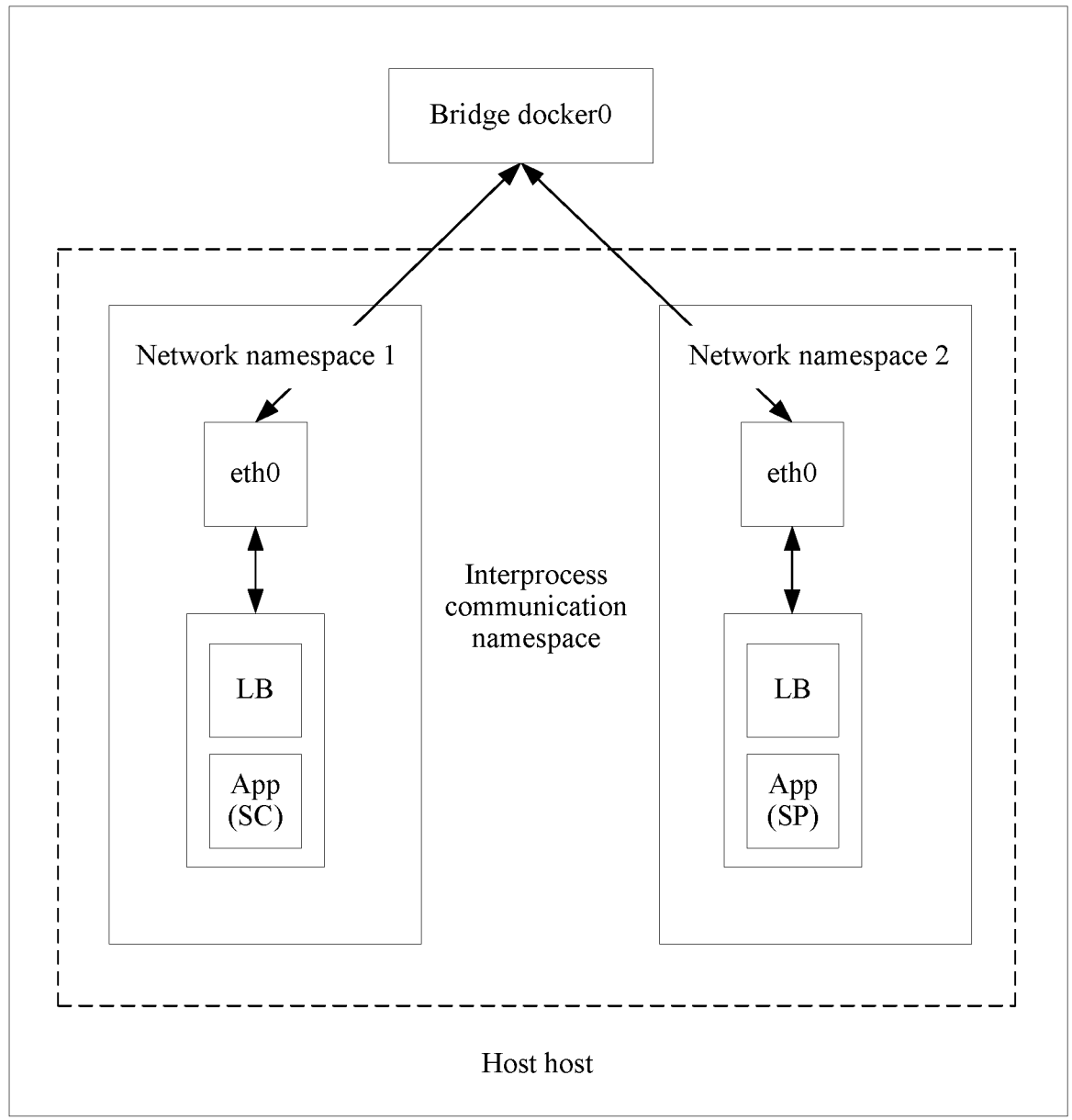
FIG. 1c is another schematic structural diagram of a container deployment solution according to this application.
Figure 2:
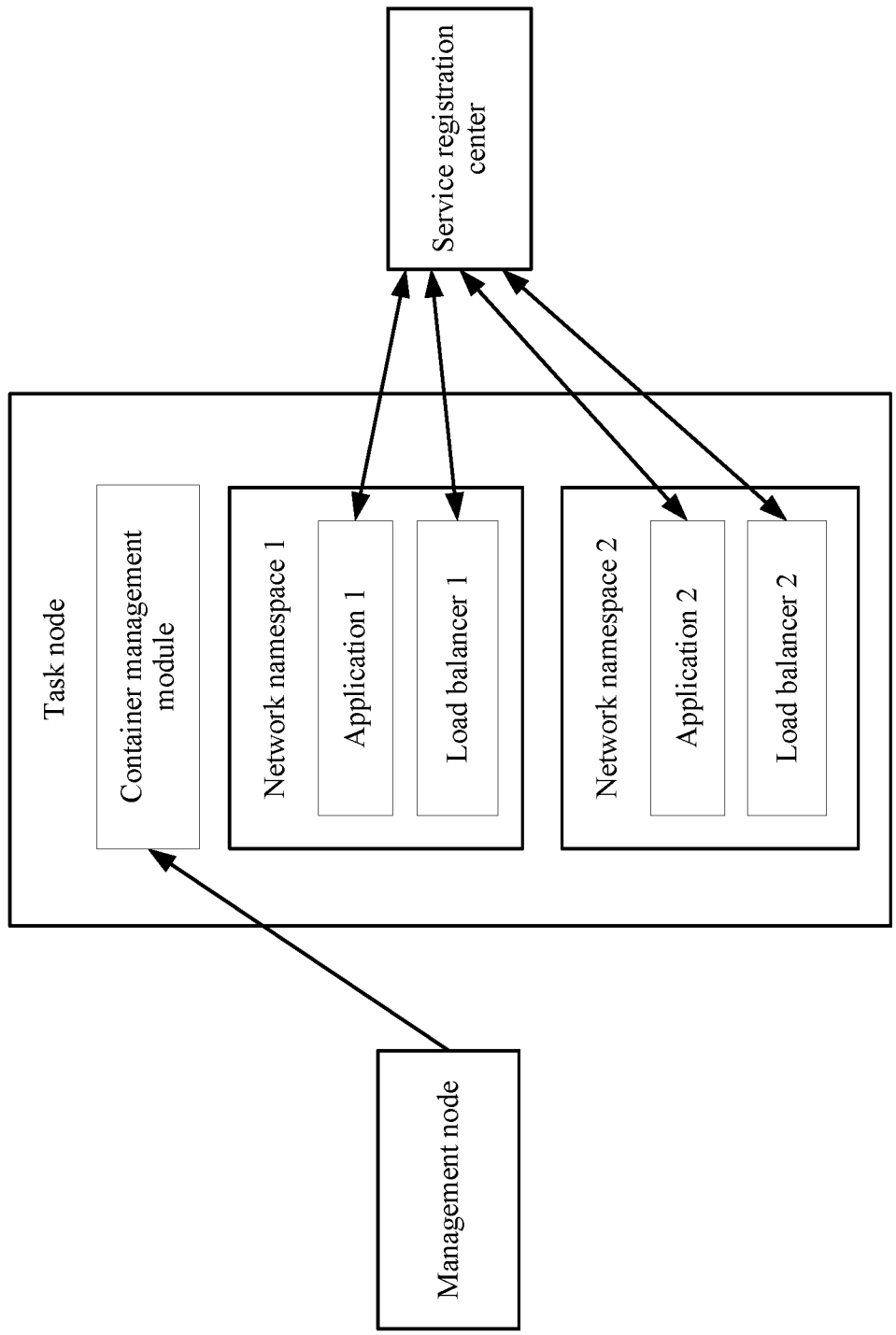
FIG. 2 is a schematic architectural diagram of a microservice deployment system according to this application.

As shown in FIG. 2, FIG. 2 is a schematic architectural diagram of a microservice deployment system based on a docker container according to this application. The deployment system includes a management node, a task node, and a service registration center. The management node may receive a container deployment message sent by service personnel, and schedule a container to a task node for running. The task node herein may refer to any physical machine PM or virtual machine VM in a network. A container management module run on the task node may be, for example, a docker container engine, and may receive an instruction from the management node, and start the container on the task node based on the instruction.

If an application running in the container needs to provide an external service, a service address needs to be registered with the service registration center. Therefore, after each container deployed with an application (App Container) is started, a service instance registration message of the application in the container is sent to the service registration center, to register a service instance, and the service instance registration message includes a service name and a service instance address. For example, an application 1 in FIG. 2 is deployed in a container. If the application 1 needs to provide an external service, a service address needs to be registered with the service registration center; that is, a service instance registration message of the application 1 in the container is sent to the service registration center, to register a service instance. A deployment manner of an application 2 is similar to that of the application 1, and details are not described herein again. Each application provides two service addresses: a network (for example, http://container_ip:8080) and an IPC message queue name (ContainerName_IPC). That is, after each container is started, a service provided by the container may be accessed from outside in two manners: the network (for example, http://container_ip:8080) and the IPC message queue name (ContainerName_IPC). The service registration center receives and stores the service instance registration message, to maintain available instance address tables of all services in the deployment system. For a structure of one service instance address table in the deployment system, refer to the following Table 1.

TABLE 1

| Service Name | Instance Address Table |
|---|---|
| ServiceA | http://10.1.0.101 :8080\|ContainerA1_IPC; http://10.2.0.101 :8080\|ContainerA2_IPC; |
| ServiceB | http://10.1.0.104 :8080\|ContainerB1_IPC; http://10.2.0.106 :8080\|ContainerB2_IPC; |
| ... | ... |

The service name in Table 1 is a service type, and the instance address table is a list of all container instance access addresses of a service type. The service registration center provides an external query function of a service instance address. All instance access addresses corresponding to a service may be obtained externally by sending a service instance query message (the message includes the service name).

Each container deployed with an application has a corresponding load balancing container (LB container) on a same task node, where the load balancing container provides a service access function for the container. For example, load balancer 1 is corresponding to the application 1 in FIG. 2, and is used to provide a service access function for the application 1. The load balancer 1 and the application 1 are deployed in different containers, and the two containers share one network namespace. A deployment manner of load balancer 2 is similar to that of the load balancer 1, and details are not described herein again. The load balancing container works on a loopback interface. The container of the application may perform high-speed data communication with the load balancing container by using the loopback interface. When the container of the application needs to access a service, the container sends a service access request to the load balancing container, and the request includes a service name to be accessed and a specific service interface (which is an interface that provides a specific function, and is similar to a function interface). For example, a service access request of http://127.0.0.1:8000/ServiceA/GetProductInfo?id=120 is used to access a GetProductInfo interface of the ServiceA in Table 1, to obtain detailed information about a product. The load balancing container obtains all service instance addresses of a service by sending the service instance query message to the service registration center. Specifically, the service registration center may further automatically identify a task node on which the load balancing container that sends a query request is located, and return, to the load balancing container based on the task node on which the load balancing container is located, an IPC address of a service instance that is located on the same task node with the load balancing container. When the container of the application needs to access a service, the container selects, based on a specific load balancing policy, a service instance address for access. Herein, reference may be made to a simple policy: A service instance on a same task node is first accessed by using an IPC interface; if there are a plurality of service provider instances on a same task node, a service provider instance is randomly bound to a service consumer container for access; and when access based on the IPC address fails, a service instance of another network interface is accessed by using a round-robin scheduling policy.

The Linux supports the loopback interface (Loopback Interface). The interface allows a client program and a server program that run on a same host to communicate with each other by using TCP/IP. A class A network 127 is reserved for the loopback interface. Usually, most systems allocate an IP address 127.0.0.1 to the interface. An IP data packet transmitted to the loopback interface is directly copied from a sending cache to a receiving cache during processing, so as to omit operations at a data link layer and a physical layer. The loopback interface can be accessed only in a same network namespace, and cannot be accessed externally.

Interprocess communication IPC is a technology provided by an operating system for performing quick communication between different processes. Compared with network communication, generally, the IPC is finally implemented through direct memory copying between processes, so as to omit processes such as encapsulation and decapsulation of a network protocol stack, route lookup, rule matching, and link transmission. Compared with the network communication, the IPC has an advantage of an extremely high speed. Common IPC technologies include memory sharing, IPC message queuing, system V/POSIX pipelining, and the like. Generally, a server creates an IPC channel, and a client exchanges data with the server by using the IPC channel.

However, different from the virtual machine, for a host, interprocess communication inside the container is actually communication between processes having a same interprocess communication namespace (IPC namespace). Therefore, a unique identifier is required to distinguish between IPC namespaces. When an IPC resource is applied, a globally unique 32-bit ID is obtained. Therefore, the IPC namespace actually includes a system IPC identifier and a file system that implements POSIX message queuing. Processes in the same IPC namespace are visible to each other, but these processes and processes in another IPC namespace are invisible to each other.

Figure 3:
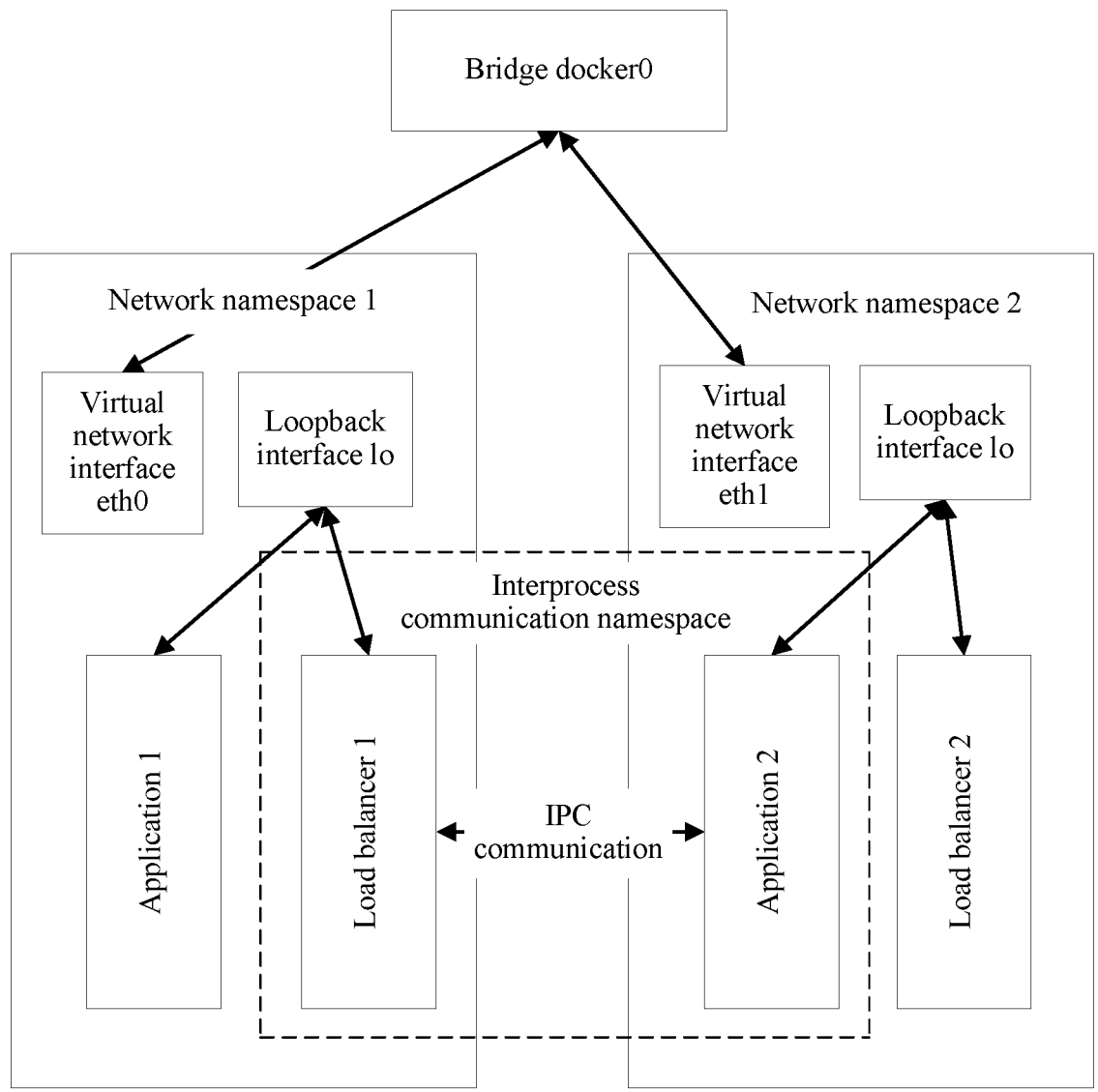
FIG. 3 is another schematic structural diagram of a container deployment solution according to this application.

Based on the architecture of the microservice deployment system shown in FIG. 2, as shown in FIG. 3, FIG. 3 is a schematic structural diagram of a container deployment solution according to this application.

As shown in FIG. 3, a container of an application (a container deployed with an application 1 or an application 2 shown in the figure) runs an application that is compiled by a user and that provides an external service. A load balancing container (a container deployed with load balancer 1 or load balancer 2 shown in the figure) is a standard container provided by a system. The container works on a loopback interface (lo shown in the figure) to receive a service access request of the application container. The container is responsible for obtaining a service access address from a service registration center, and forwards the service access request of the application container to a selected service instance container by using a specific load balancing policy, so as to obtain a service result, and return the service result to the application container. The application container and a load balancing container corresponding to the application container share a same network namespace. A virtual network interface is a standard virtual network device (may be considered as a network adapter). A container of the application 1 and a container of the application 2 shown in FIG. 3 may respectively perform, by using virtual network interfaces in their respective network namespaces, data communication with containers outside the network namespace, or may respectively perform quick data communication (network data may be directly copied to a corresponding process in a memory copy manner) with a container in the same network namespace by using the loopback interface (lo). However, a container (process) outside the same network namespace cannot access the loopback interface lo in the network namespace, and can perform standard network data communication by using only the virtual network interface. The application container runs by using an independent IPC namespace. Therefore, when compiling an application, the user does not need to consider an impact of another container, so that isolation between applications is maintained. When the container management module on the task node deploys a container, if the container management module detects that the task node has a container that needs to be accessed by a to-be-deployed container, the container management module sets an IPC namespace of a load balancing container corresponding to the to-be-deployed container to an IPC namespace of the container that needs to be accessed. In this way, the load balancing container corresponding to the to-be-deployed container may perform, without damaging isolation between the to-be-deployed container and the container that needs to be accessed (the container of the application 1 and the container of the application 2 in the figure), high-speed IPC communication with the container that needs to be accessed. In addition, a standard load balancing container is provided by the system, behavior is completely controlled, and therefore sharing the IPC namespace does not affect security and isolation of applications.

Figure 4:
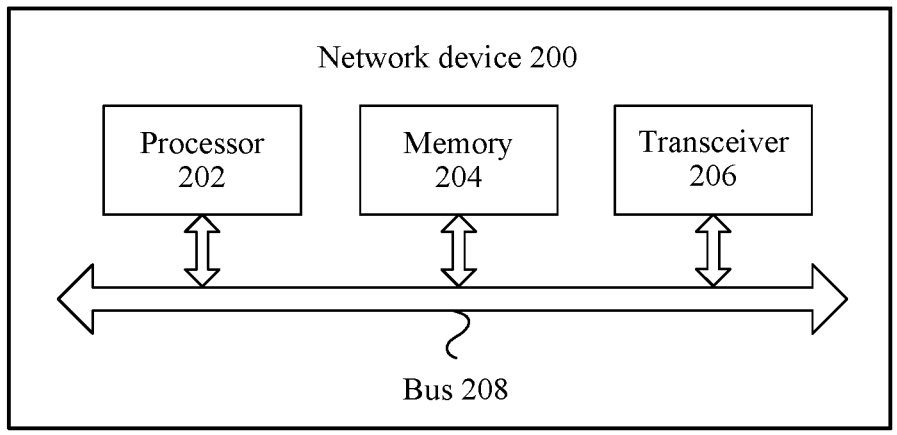
FIG. 4 is a schematic structural diagram of a network device according to this application.

The task node in FIG. 3 may be implemented by using a network device 200 in FIG. 4. A schematic structural diagram of the network device 200 is shown in FIG. 4. The network device 200 includes a processor 202, a memory 204, and a transceiver 206, and may further include a bus 208.

Communication connections among the processor 202, the memory 204, and the transceiver 206 may be implemented by using the bus 208, or communication may be implemented by using other means such as wireless transmission.

The memory 204 may include a volatile memory, for example, a random-access memory (RAM for short). The memory 204 may also include a non-volatile memory, for example, a read-only memory (ROM for short), a flash memory, a hard disk drive (HDD for short), or a solid state drive (SSD for short). The memory 204 may further include a combination of the foregoing types of memories. When technical solutions provided in this application are implemented by using software, program code that is used to implement a container deployment method provided in FIG. 5 in this application is stored in the memory 204, and is executed by the processor 202.

The network device 200 communicates with another device by using the transceiver 206.

The processor 202 may be a central processing unit (CPU).

The transceiver 206 is configured to receive a container deployment message, where the container deployment message includes container image information and association information of a container.

The processor 202 is configured to: create, based on the container image information, a container for a first service, and a first network namespace and a first interprocess communication IPC namespace that are corresponding to the container for the first service;

create a first load balancing container corresponding to the container for the first service, and set a running parameter of the first load balancing container to a parameter of the first network namespace, where the running parameter is used by the first load balancing container to share the first network namespace during running;

create a loopback interface in the first network namespace, where the loopback interface is used by the first load balancing container to communicate with the container for the first service; and determine, based on the association information of the container, that the network device has a container that is for a second service and that is associated with the container for the first service, and obtain a parameter of a second IPC namespace corresponding to the container for the second service; and set a starting parameter of the first load balancing container to the parameter of the second IPC namespace, where the starting parameter is used by the first load balancing container to communicate with the container for the second service by using an IPC interface of the second IPC namespace after the first load balancing container is started, and the parameter of the second IPC namespace is different from a parameter of the first IPC namespace.

The first load balancing container shares the first network namespace corresponding to the container for the first service during running, that is, may use a network device in the first network namespace. Therefore, a load balancing module running in the first load balancing container can be bound to the loopback interface established in the first network namespace, to provide a load balancing service. Except the container for the first service that is corresponding to the first load balancing container, another container cannot access the load balancing container by using the loopback interface, so as to ensure isolation between containers on a same host. When the network device 200 has created the container for the second service, and determines, based on the received container deployment message, that the container for the first service is associated with the container for the second service, the network device 200 sets the starting parameter of the first load balancing container to the parameter of the second IPC namespace corresponding to the container for the second service, so that when the first load balancing container is started, the first load balancing container may access the container for the second service by using the IPC interface of the second IPC namespace, so as to increase an access speed between containers while ensuring isolation between containers on a same host.

Optionally, the processor 202 is further configured to:

when determining, based on the association information of the container, that the network device has the container that is for the second service and that is associated with the container for the first service, set the starting parameter of the first load balancing container to a parameter of a third IPC namespace, where the parameter of the third IPC namespace is different from both the parameter of the first IPC namespace and the parameter of the second IPC namespace.

Optionally, a bridge is created on the network device 200, the bridge is configured to provide a data exchange service, and after the processor 202 is configured to create the first network namespace and the first interprocess communication IPC namespace that are corresponding to the container for the first service, the processor 202 is further configured to:

create a virtual network device in the first network namespace, where the virtual network device is configured to connect to the bridge, so that the container for the first service communicates with a container that is for another service and that is outside the first network namespace.

Optionally, after the processor 202 is configured to create the virtual network device, the processor 202 is further configured to:

send, to a service registration center, a service address corresponding to the first service, where the service address corresponding to the first service includes a network interface address of the virtual network device and an IPC interface address of the first IPC namespace.

Figure 5:
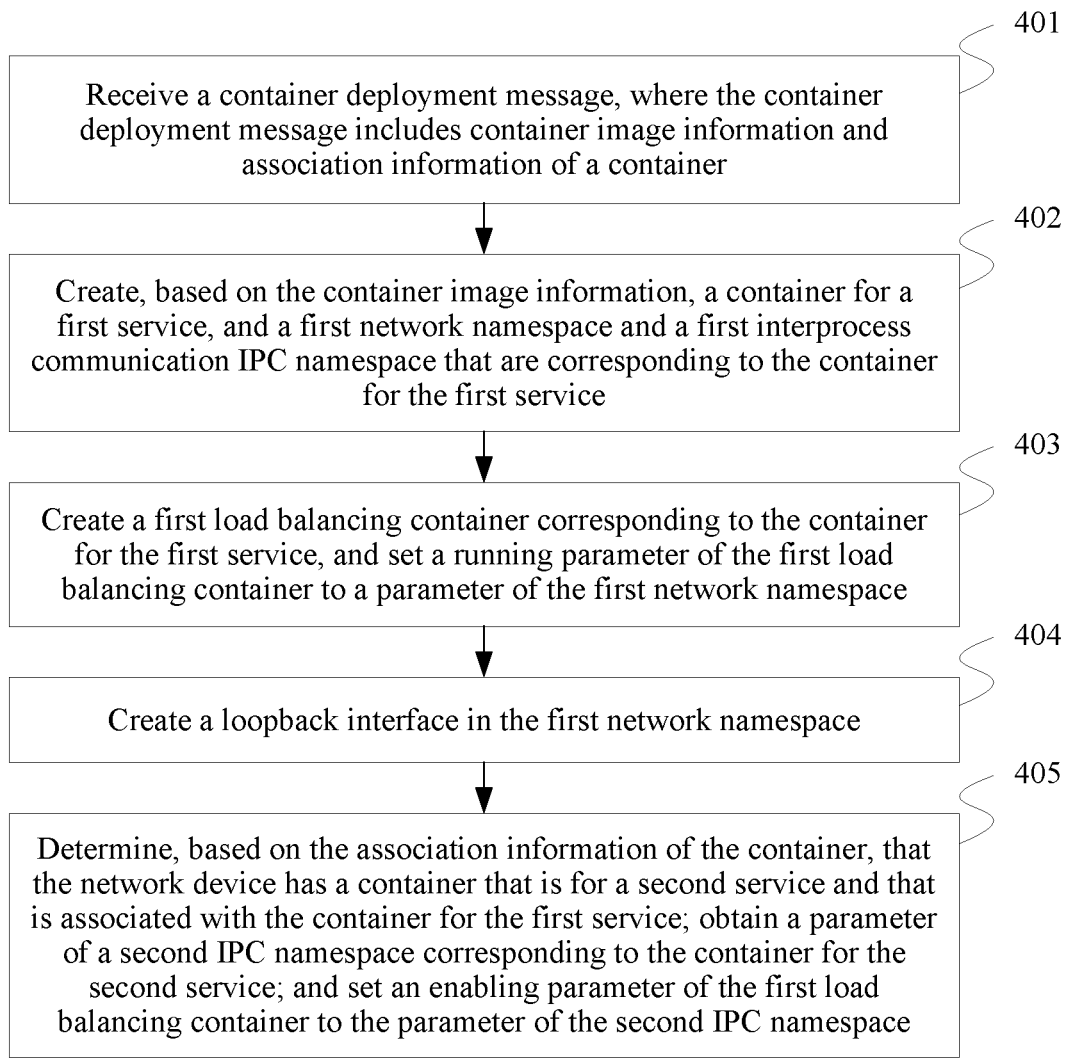
FIG. 5 is a schematic flowchart of a container deployment method according to this application.

This application further provides a container deployment method. The network device 200 in FIG. 4 performs the method during running. A schematic flowchart of the method is shown in FIG. 5.

401. Receive a container deployment message, where the container deployment message includes container image information and association information of a container.

It should be noted that the network device may be a physical machine or a virtual machine in a network, and the network device receives the container deployment message. In a possible implementation, the network device may receive, by using a container management module in the network device, the container deployment message sent by a management device. The container deployment message includes the container image information and the association information of the container. The container image information includes some parameters required for creating a container, for example, an identifier ID of an image. Optionally, the container deployment message further includes another parameter required for creating the container, and specifically, the another parameter is determined by a type of the to-be-created container. The association information of the container is used to indicate a container for another service that needs to be accessed, for example, when a container for a first service is deployed, the container for another service needs to be accessed to obtain a corresponding setting parameter.

402. Create, based on the container image information, a container for a first service, and a first network namespace and a first interprocess communication IPC namespace that are corresponding to the container for the first service;

Optionally, a bridge is created on the network device, the bridge is configured to provide a data exchange service, and after the first network namespace and the first interprocess communication IPC namespace that are corresponding to the container for the first service are created, the method further includes:

creating a virtual network device in the first network namespace, where the virtual network device is configured to connect to the bridge, so that the container for the first service communicates with a container that is for another service and that is outside the first network namespace.

Optionally, after the virtual network device is created, the method further includes:

sending, to a service registration center, a service address corresponding to the first service, where the service address corresponding to the first service includes a network interface address of the virtual network device and an IPC interface address of the first IPC namespace.

It should be noted that the network device creates, based on the container image information in the container deployment message, the container for the first service, and the first network namespace and the first interprocess communication IPC namespace that are corresponding to the container for the first service, where the container for the first service is used to deploy a service provided by an application. Specifically, based on the container deployment message, the container management module in the network device starts a container instance in a bridging mode of a bridge (a bridge is referred to as a docker0 bridge in the following) provided by a docker container engine. For example, the container for the first service (C2 for short in the following) is created based on the container deployment message. Specifically, the docker container engine creates a new network namespace (Np2 for short in the following) and a new IPC namespace (Ip2 for short in the following) for C2, creates a standard Linux virtual network device interface eth0 (for example, an IP address is 10.1.0.101) in Np2, to provide a network service for a container in Np2, and then connects the eth0 interface to the docker0 bridge of the network device by using a virtual network device pair (veth pair) technology. In this way, the container in Np2 may perform standard network communication with another container by using the docker0 bridge. After C2 is started, C2 runs in the network namespace Np2 and the IPC namespace Ip2, a service registration module applied to C2 sends, to a service registration center, a service address of the service registration module (that is, an address of a virtual network device interface in the network namespace corresponding to C2 and an IPC interface address in the corresponding IPC namespace, for example, http://10.1.0.101:8080 and ContainerC2_IPC) and information about a service to which the service registration module belongs (for example, the service is ServiceB), to register a service instance.

403. Create a first load balancing container corresponding to the container for the first service, and set a running parameter of the first load balancing container to a parameter of the first network namespace.

It should be noted that the network device creates the first load balancing container corresponding to the container for the first service, and sets the running parameter of the first load balancing container to the parameter of the first network namespace, and the running parameter is used by the first load balancing container to share the first network namespace during running. Specifically, the system provides a standard load balancing image Mlb that includes a load balancing module. The container management module in the network device automatically creates a load balancing container (for example, C3) corresponding to the container for the first service (for example, C2) by using the load balancing image Mlb. A load balancing module in the load balancing container (for example, C3) may find all instance access addresses of each service in the service registration center. For a service instance on a same task node (network device), an IPC access address of the instance is also returned. A running parameter net_namespace of C3 is set to a parameter corresponding to Np2, so that C3 shares the network namespace Np2 with C2 during running, that is, both C3 and C2 may use the network device in Np2. It is assumed that a container C1 for a second service (for example, the service is ServiceA) has been created on a same task node (network device). For example, when C3 queries the service registration center for an instance address table of the ServiceA on the task node (network device) on which C1 is located, a returned address list is as follows:

http://10.1.0.101:8080|ContainerC1_IPC;
http://10.2.0.101:8080.

The service registration center detects that C1 and C3 are located on the same task node (network device). Therefore, both a network address of C1 (that is, an address of a virtual network device interface created in the network namespace to which C1 belongs) and an IPC interface address of C1 (that is, an IPC interface address in the IPC namespace to which C1 belongs) are returned. Subsequently, when C3 needs to access C1, C3 first selects an interface of an IPC service address of ContainerC1_IPC for access.

404. Create a loopback interface in the first network namespace.

It should be noted that the network device creates the loopback interface in the first network namespace, where the loopback interface is used by the first load balancing container to communicate with the container for the first service. Specifically, a Linux command "ifconfig lo:0 127.0.0.1 netmask 255.0.0.0 up" may be used to create and start a loopback interface, and specify an internal access address of 127.0.0.1. The running parameter net_namespace of C3 is set to the parameter corresponding to Np2, so that C3 shares the network namespace Np2 with C2 during running, that is, both C3 and C2 may use the virtual network device in Np2. Therefore, the load balancing module running in C3 is bound to the loopback interface in the first network namespace, to provide a load balancing service.

405. Determine, based on the association information of the container, that the network device has a container that is for a second service and that is associated with the container for the first service; obtain a parameter of a second IPC namespace corresponding to the container for the second service; and set a starting parameter of the first load balancing container to the parameter of the second IPC namespace.

The starting parameter is used by the first load balancing container to communicate with the container for the second service by using an IPC interface of the second IPC namespace after the first load balancing container is started, and the parameter of the second IPC namespace is different from a parameter of the first IPC namespace.

Optionally, the method further includes:

determining, based on the association information of the container, that the network device has no container associated with the container for the first service, and setting the starting parameter of the first load balancing container to a parameter of a third IPC namespace, where the parameter of the third IPC namespace is different from both the parameter of the first IPC namespace and the parameter of the second IPC namespace.

It should be noted that, in this embodiment of the present invention, the container management module in the network device may check whether the network device has an affinity container of the container for the first service (the affinity container is the container associated with the container for the first service, that is, a container for another service that needs to be accessed by the container for the first service).

If the network device has created the container for the second service, and determines, based on the association information of the container, that the container for the first service is associated with the container for the second service, that is, the container for the first service needs to access the container for the second service to obtain a related parameter of the container for the second service, the network device searches for the second IPC namespace corresponding to the container for the second service, and sets the starting parameter of the first load balancing container as the parameter of the second IPC namespace, so that the first load balancing container may communicate with the container for the second service by using the IPC interface of the second IPC namespace after the first load balancing container is started. For example, the network device has created the container C1 for the second service (ServiceA). The container C2 for the first service (ServiceB) is associated with the container C1 for the second service (ServiceA). The container management module in the network device finds the affinity container C1; binds the container C1 for the second service, to provide a service for the container C2 for the first service by using the IPC; and learns that an IPC namespace of C1 is Ip1. If there are a plurality of affinity containers, one of the affinity containers may be randomly selected for binding. The starting parameter of the load balancing container C3 corresponding to the container C2 for the first service is set to the parameter of the second IPC namespace ipc_namespace:Ip1, so that after C3 is started, C3 may perform IPC communication with a container in Ip1 (that is, may perform IPC communication with the container C1 for the second service). In addition, after the load balancing container C3 corresponding to the container C2 for the first service is started on the network device, the load balancing module in C3 works on the loopback interface in the network namespace corresponding to the container for the first service, that is, C3 can be accessed only by C2 in the same network namespace (network namespace) by using an address of the loopback interface (for example, 127.0.0.1), and cannot be accessed by another container.

Further, if it is determined, based on the association information of the container, that the network device has no container associated with the container for the first service, the network device sets the starting parameter of the first load balancing container to the parameter of the third IPC namespace, where the parameter of the third IPC namespace is different from both the parameter of the first IPC namespace and the parameter of the second IPC namespace. In this case, the first load balancing container uses an independent third IPC namespace, and does not share an IPC namespace of another container.

In the container deployment method provided in this application, the first load balancing container shares the first network namespace corresponding to the container for the first service during running, that is, may use a network device in the first network namespace. Therefore, a load balancing module running in the first load balancing container can be bound to the loopback interface established in the first network namespace, to provide a load balancing service. Except the container for the first service that is corresponding to the first load balancing container, another container cannot access the load balancing container by using the loopback interface, so as to ensure isolation between containers on a same host. When the network device has created the container for the second service, and determines, based on the received container deployment message, that the container for the first service is associated with the container for the second service, the network device sets the starting parameter of the first load balancing container to the parameter of the second IPC namespace corresponding to the container for the second service, so that when the first load balancing container is started, the first load balancing container may access the container for the second service by using the IPC interface of the second IPC namespace, so as to increase an access speed between containers while ensuring isolation between containers on a same host.

Figure 6:
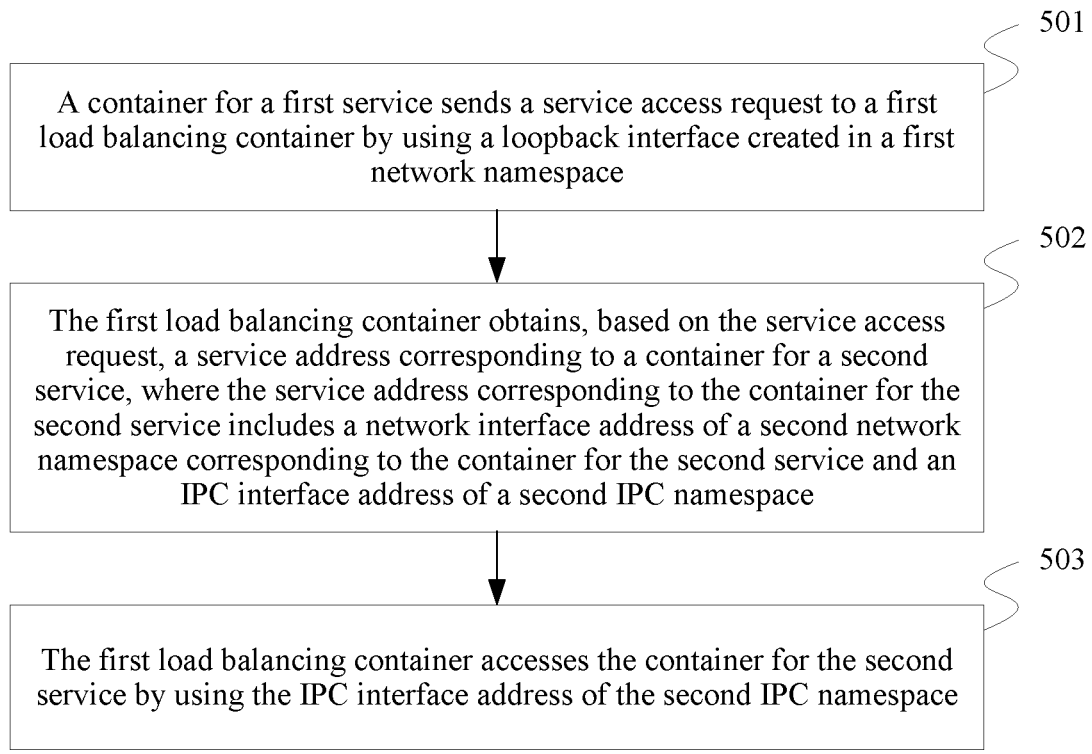
FIG. 6 is a schematic flowchart of a communication method between services according to this application.

This application further provides a communication method between services, applied to the network device 200 provided in this application. Based on the container deployment method provided in this application, the communication method between services provided in this application has the following prerequisites: The network device 200 has created and run a container for a second service and a corresponding second load balancing container, and the container for the second service has a corresponding second network namespace and a corresponding second IPC namespace; and when a container for a first service and a corresponding first load balancing container are created, a first network namespace and a first interprocess communication IPC namespace that are corresponding to the container for the first service are created, a running parameter of the first load balancing container is set to a parameter of the first network namespace, a loopback interface is created in the first network namespace, and a starting parameter of the first load balancing container is set to a parameter of the second IPC namespace, where the parameter of the second IPC namespace is different from a parameter of the first IPC namespace. A schematic flowchart of the communication method between services is shown in FIG. 6.

501. The container for the first service sends a service access request to the first load balancing container by using the loopback interface created in the first network namespace.

502. The first load balancing container obtains, based on the service access request, a service address corresponding to the container for the second service, where the service address corresponding to the container for the second service includes a network interface address of the second network namespace corresponding to the container for the second service and an IPC interface address of the second IPC namespace.

503. The first load balancing container accesses the container for the second service by using the IPC interface address of the second IPC namespace.

It should be noted that, for example, the network device 200 has created and run the container (C1) for the second service and the corresponding second load balancing container, and the container (C1) for the second service has the corresponding second network namespace (Np1) and second IPC namespace (Ip1). When the container (C2) for the first service and the corresponding first load balancing container (C3) are created, the first network namespace (Np2) and the first interprocess communication IPC namespace (Ip2) that are corresponding to the container (C2) for the first service are created, a running parameter (net_namespace) of the first load balancing container (C3) is set to a parameter of the first network namespace (Np2), a loopback interface (lo) is created in the first network namespace, and a starting parameter (ipc_namespace) of the first load balancing container (C3) is set to a parameter of the second IPC namespace (Ip1), where the parameter of the second IPC namespace (Ip1) is different from a parameter of the first IPC namespace (Ip2).

When C2 accesses C1 by using C3, C2 sends the service access request to C3 by using the loopback interface lo created in Ip2. C3 obtains a service address corresponding to C1 from a service registration center based on the service access request. The service address corresponding to C1 includes the network interface address (for example, http://10.2.0.101:8080) of the second network namespace (Ip1) corresponding to C1 and the IPC interface address (for example, http://10.1.0.101:8080|ContainerC1_IPC) of the second IPC namespace (Ip1). C3 accesses C1 by using the IPC interface address of the second IPC namespace (Ip1).

In the communication method between services provided in this application, the first load balancing container shares the first network namespace corresponding to the container for the first service during running, that is, may use a network device in the first network namespace. Therefore, a load balancing module running in the first load balancing container can be bound to the loopback interface established in the first network namespace, to provide a load balancing service. Except the container for the first service that is corresponding to the first load balancing container, another container cannot access the load balancing container by using the loopback interface. Therefore, when the container for the first service is deployed while ensuring isolation between containers on a same host, the starting parameter of the first load balancing container is set to the parameter of the second IPC namespace corresponding to the container for the second service, so that when the first load balancing container is started, the first load balancing container may access the container for the second service by using the IPC interface address of the second IPC namespace, so as to increase an access speed between containers while ensuring isolation between containers on a same host.

It should be noted that, in this embodiment of this application, unless otherwise specified, a sequence of steps and an interdependency between the steps are not limited.

An embodiment of this application further provides a container deployment apparatus 600. The apparatus 600 may be implemented by using the network device 200 shown in FIG. 4, may be implemented by using an application-specific integrated circuit (ASIC), or may be implemented by using a programmable logic device (PLD). The PLD may be a complex programmable logic device (CPLD), an FPGA, generic array logic (GAL), or any combination thereof. The container deployment apparatus 600 is configured to implement a container deployment method shown in FIG. 5. When the container deployment method shown in FIG. 5 is performed by using software, the apparatus 600 may alternatively be a software module.

Figure 7:
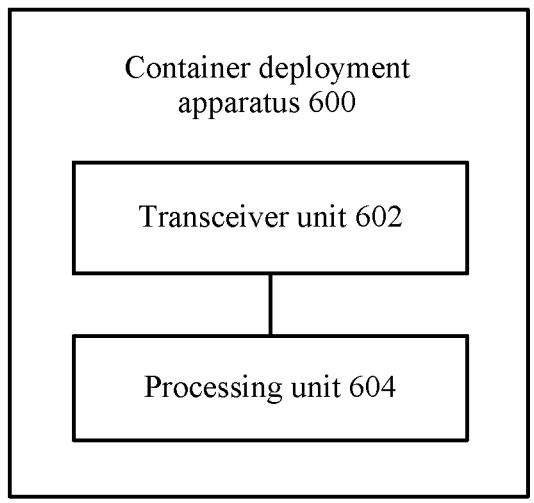
FIG. 7 is a schematic structural diagram of a container deployment apparatus according to this application.

A schematic structural diagram of the container deployment apparatus 600 is shown in FIG. 7. The container deployment apparatus 600 includes a transceiver unit 602 and a processing unit 604. When the transceiver unit 602 works, the transceiver unit 602 performs step 401 and the optional solution in step 401 in the container deployment method shown in FIG. 5. When the processing unit 604 works, the processing unit 604 performs steps 402 to 405 and the optional solutions in steps 402 to 405 in the container deployment method shown in FIG. 5. It should be noted that, in this embodiment of this application, the transceiver unit 602 may alternatively be implemented by the transceiver 206 shown in FIG. 4, and the processing unit 604 may alternatively be implemented by the processor 202 shown in FIG. 4.

The container deployment apparatus 600 receives a container deployment message, and creates a container for the first service and a first load balancing container corresponding to the container for the first service. The first load balancing container shares a first network namespace corresponding to the container for the first service during running, that is, may use a network device in the first network namespace. Therefore, a load balancing module running in the first load balancing container can be bound to a loopback interface established in the first network namespace, to provide a load balancing service. Except the container for the first service that is corresponding to the first load balancing container, another container cannot access the load balancing container by using the loopback interface, so as to ensure isolation between containers on a same host. When the network device has created a container for a second service, and determines, based on the received container deployment message, that the container for the first service is associated with the container for the second service, the network device sets a starting parameter of the first load balancing container to a parameter of a second IPC namespace corresponding to the container for the second service, so that when the first load balancing container is started, the first load balancing container may access the container for the second service by using an IPC interface of the second IPC namespace, so as to increase an access speed between containers while ensuring isolation between containers on a same host.

An embodiment of this application further provides a communications apparatus 700 between services. The apparatus 700 may be implemented by using the network device 200 shown in FIG. 4, or may be implemented by using an ASIC or a PLD. The foregoing PLD may be a complex programmable logic device CPLD, an FPGA, GAL, or any combination thereof. The communications apparatus 700 between services is configured to implement the communication method between services shown in FIG. 6. When the communication method between services shown in FIG. 6 is performed by using software, the apparatus 700 may alternatively be a software module.

Figure 8:
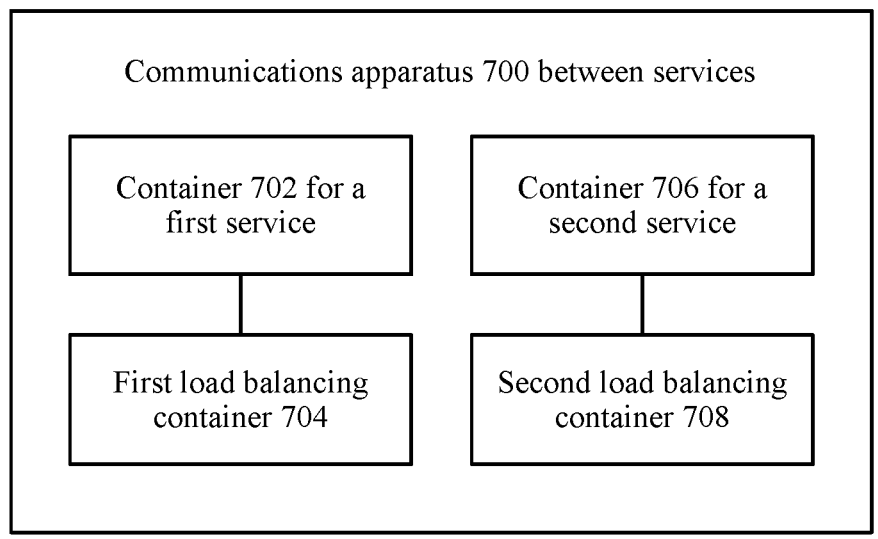
FIG. 8 is a schematic structural diagram of a communications apparatus between services according to this application.

A schematic structural diagram of the communications apparatus 700 between services is shown in FIG. 8. The communications apparatus 700 between services includes: a container 702 for a first service and a corresponding first load balancing container 704, a container 706 for a second service and a corresponding second load balancing container 708. When the container 702 for the first service works, the container 702 for the first service performs step 501 and the optional solution in step 501 in the communication method between services shown in FIG. 6. When the first load balancing container 704 for the first service works, the first load balancing container 704 performs steps 502 and 503 and the optional solution in steps 502 and 503 in the communication method between services shown in FIG. 6.

In the communications apparatus 700 between services, the first load balancing container 704 shares a first network namespace corresponding to the container 702 for the first service during running, that is, may use a network device in the first network namespace. Therefore, a load balancing module running in the first load balancing container 704 can be bound to a loopback interface established in the first network namespace, to provide a load balancing service. Except the container 702 for the first service that is corresponding to the first load balancing container 704, another container cannot access the load balancing container by using the loopback interface. Therefore, when the container 702 for the first service is deployed while ensuring isolation between containers on a same host, a starting parameter of the first load balancing container 704 is set to a parameter of a second IPC namespace corresponding to the container 706 for the second service, so that when the first load balancing container 704 is started, the first load balancing container may access the container 706 for the second service by using an IPC interface address of the second IPC namespace, so as to increase an access speed between containers while ensuring isolation between containers on a same host.

For relevant description of the foregoing apparatus, refer correspondingly to relevant description and effects in the method embodiment part for understanding. Details are not described herein again.

Persons skilled in the art may clearly know that, for convenience and conciseness of description, in the foregoing embodiments, the embodiments emphasize different aspects, and for a part not described in detail in one embodiment, reference may be made to relevant description of another embodiment.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that the actions and modules involved in this specification are not necessarily mandatory to the present invention.

In the several embodiments provided in the present invention, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network devices. Some or all of the devices may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, all of the technical solutions of the present invention or the part of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash disk, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the claims.

What is claimed is:

1. A method of container deployment applied to a network device, and comprising:
   receiving a container deployment message comprising container image information and association information of a container;
   creating, based on the container image information, a container for a first service, and a first network namespace and a first interprocess communication IPC namespace that are corresponding to the container for the first service;
   creating a first load balancing container corresponding to the container for the first service, and setting a running parameter of the first load balancing container to a parameter of the first network namespace, wherein the running parameter is used by the first load balancing container to share the first network namespace during running;
   creating a loopback interface in the first network namespace, wherein the loopback interface is used by the first load balancing container to communicate with the container for the first service;
   determining, based on the association information of the container, that the network device has a container for a second service and associated with the container for the first service; and
   obtaining a parameter of a second IPC namespace corresponding to the container for the second service, and setting a starting parameter of the first load balancing container to the parameter of the second IPC namespace, wherein the starting parameter is used by the first load balancing container to communicate with the container for the second service by using an IPC interface of the second IPC namespace after the first load balancing container is started, and the parameter of the second IPC namespace is different from a parameter of the first IPC namespace.

2. The method according to claim 1, wherein the method further comprises:
   determining, based on the association information of the container, that the network device has no container associated with the container for the first service; and
   setting the starting parameter of the first load balancing container to a parameter of a third IPC namespace, wherein the parameter of the third IPC namespace is different from both the parameter of the first IPC namespace and the parameter of the second IPC namespace.

3. The method according to claim 1, wherein a bridge is created on the network device, the bridge is configured to provide a data exchange service, and after the creating a first network namespace and a first interprocess communication IPC namespace that are corresponding to the container for the first service, the method further comprises:
creating a virtual network device in the first network namespace, wherein the virtual network device is configured to connect to the bridge, so that the container for the first service communicates with a container that is for another service and that is outside the first network namespace.

4. The method according to claim 3, wherein after the creating a virtual network device, the method further comprises:
sending, to a service registration center, a service address corresponding to the first service, wherein the service address corresponding to the first service comprises a network interface address of the virtual network device and an IPC interface address of the first IPC namespace.

5. A method of communication between services, applied to a network device, wherein the network device has created and run a container for a second service and a corresponding second load balancing container, and the container for the second service has a corresponding second network namespace and a corresponding second interprocess communication IPC namespace; when a container for a first service and a corresponding first load balancing container are created, a first network namespace and a first IPC namespace that are corresponding to the container for the first service are created, a running parameter of the first load balancing container is set to a parameter of the first network namespace, a loopback interface is created in the first network namespace, and a starting parameter of the first load balancing container is set to a parameter of the second IPC namespace, wherein the parameter of the second IPC namespace is different from a parameter of the first IPC namespace; and the method comprising:
sending, by the container for the first service, a service access request to the first load balancing container by using the loopback interface created in the first network namespace;
obtaining, by the first load balancing container based on the service access request, a service address corresponding to the container for the second service, wherein the service address corresponding to the container for the second service comprises a network interface address of the second network namespace corresponding to the container for the second service and an IPC interface address of the second IPC namespace; and
accessing, by the first load balancing container, the container for the second service by using the IPC interface address of the second IPC namespace.

6. A container deployment apparatus, comprising:
a transceiver configured to receive a container deployment message comprising container image information and association information of a container; and
a processor configured to:
create, based on the container image information, a container for a first service, and a first network namespace and a first interprocess communication IPC namespace that are corresponding to the container for the first service;
create a first load balancing container corresponding to the container for the first service, and set a running parameter of the first load balancing container to a parameter of the first network namespace, wherein the running parameter is used by the first load balancing container to share the first network namespace during running;
create a loopback interface in the first network namespace, wherein the loopback interface is used by the first load balancing container to communicate with the container for the first service;
determine, based on the association information of the container, that the network device has a container that is for a second service and that is associated with the container for the first service; and
obtain a parameter of a second IPC namespace corresponding to the container for the second service, and set a starting parameter of the first load balancing container to the parameter of the second IPC namespace, wherein the starting parameter is used by the first load balancing container to communicate with the container for the second service by using an IPC interface of the second IPC namespace after the first load balancing container is started, and the parameter of the second IPC namespace is different from a parameter of the first IPC namespace.

7. The apparatus according to claim 6, wherein the processor is further configured to:
determine, based on the association information of the container, that the network device has no container associated with the container for the first service; and
set the starting parameter of the first load balancing container to a parameter of a third IPC namespace, wherein the parameter of the third IPC namespace is different from both the parameter of the first IPC namespace and the parameter of the second IPC namespace.

8. The apparatus according to claim 6, wherein a bridge is created on the apparatus, the bridge is configured to provide a data exchange service, and after the processor is configured to create the first network namespace and the first interprocess communication IPC namespace that are corresponding to the container for the first service, the processor is further configured to:
create a virtual network device in the first network namespace, wherein the virtual network device is configured to connect to the bridge, so that the container for the first service communicates with a container that is for another service and that is outside the first network namespace.

9. The apparatus according to claim 8, wherein after the processor is configured to create the virtual network device, the processor is further configured to:
send, to a service registration center, a service address corresponding to the first service, wherein the service address corresponding to the first service comprises a network interface address of the virtual network device and an IPC interface address of the first IPC namespace.

10. A communications apparatus between services, wherein the apparatus has created and run a container for a second service and a corresponding second load balancing container, and the container for the second service has a corresponding second network namespace and a corresponding second interprocess communication IPC namespace; when a container for a first service and a corresponding first load balancing container are created, a first network namespace and a first IPC namespace that are corresponding to the container for the first service are created, a running parameter of the first load balancing container is set to a parameter of the first network namespace, a loopback interface is created in the first network namespace, and a starting parameter of the first load balancing container is set to a parameter of the second IPC namespace, wherein the parameter of the second IPC namespace is different from a parameter of the first IPC namespace; and the apparatus comprising:

- the container for the first service, configured to send a service access request to the first load balancing container by using the loopback interface created in the first network namespace;
- the first load balancing container, configured to obtain, based on the service access request, a service address corresponding to the container for the second service, wherein the service address corresponding to the container for the second service comprises a network interface address of the second network namespace corresponding to the container for the second service and an IPC interface address of the second IPC namespace; and
- the first load balancing container, configured to access the container for the second service by using the IPC interface address of the second IPC namespace.

* * * * *